Jan. 12, 1965        F. S. WEISE        3,165,353
AUTOMOBILE ROOF CARRIER
Filed Feb. 16, 1961        2 Sheets-Sheet 1
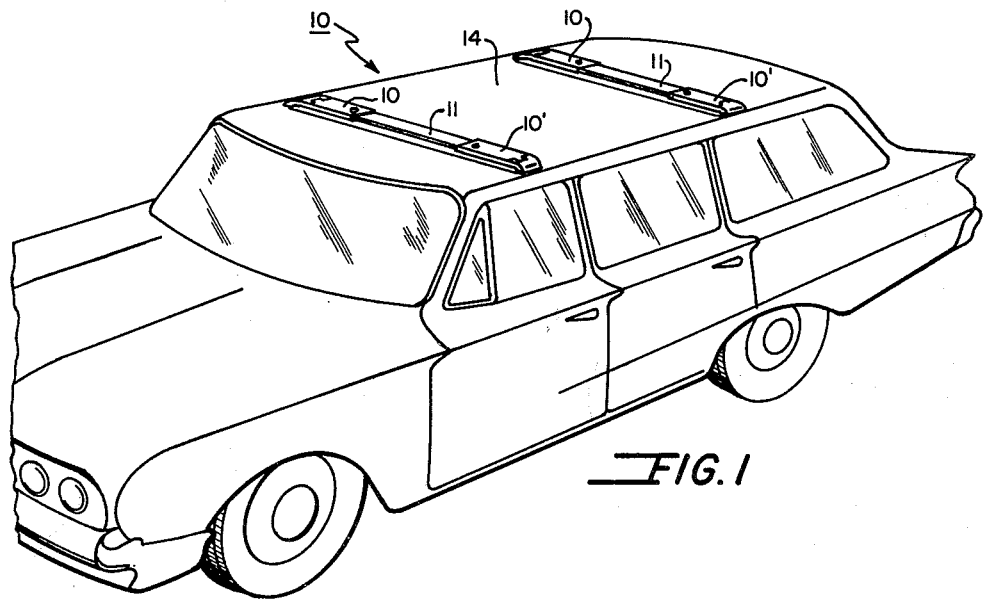
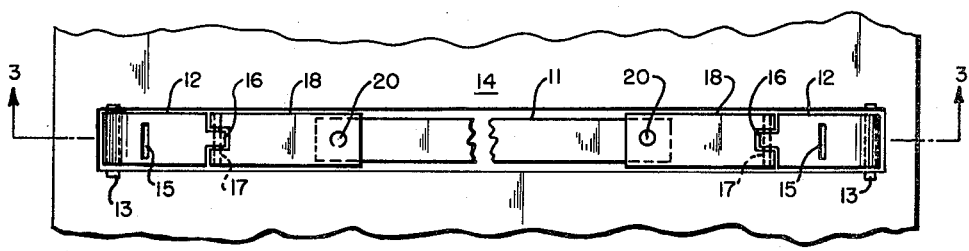
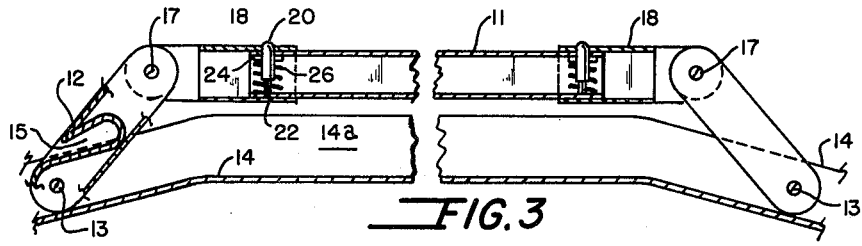
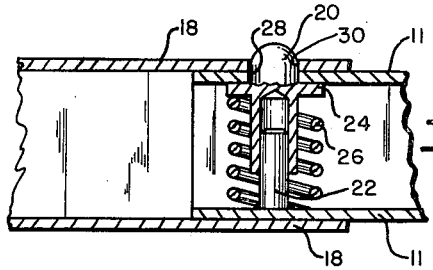
INVENTOR.
FRANK S. WEISE Jan. 12, 1965  F. S. WEISE  3,165,353
AUTOMOBILE ROOF CARRIER
Filed Feb. 16, 1961  2 Sheets-Sheet 2
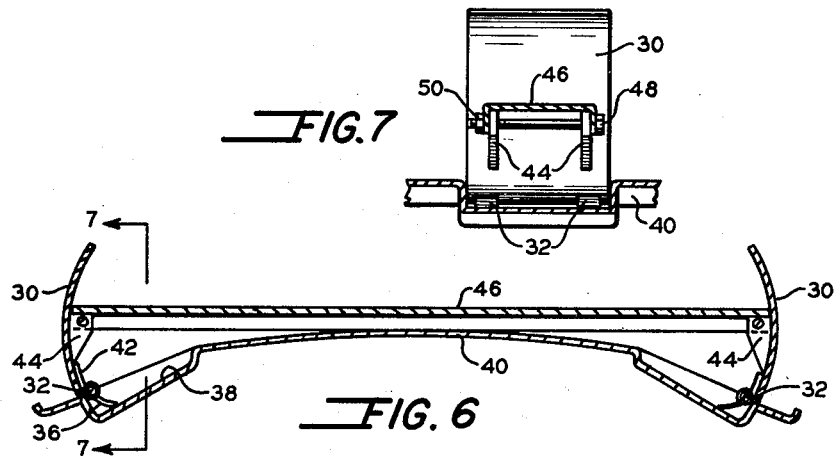
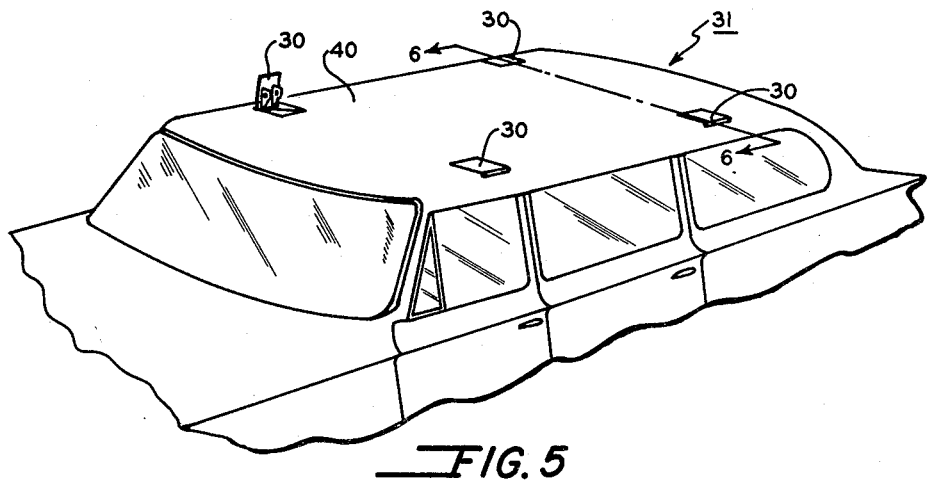
INVENTOR.
FRANK S. WEISE
BY
Des Jardins, Robinson, Little & Schad
ATTORNEYS

United States Patent Office 3,165,353
Patented Jan. 12, 1965

3,165,353
AUTOMOBILE ROOF CARRIER
Frank S. Weise, 4237 Springdale Road, Cincinnati, Ohio
Filed Feb. 16, 1961, Ser. No. 89,799
1 Claim. (Cl. 296—137)

This invention relates generally to carriers adapted to be mounted on top of a motor vehicle and more specifically to carrier support brackets and frames for mounting on the top of an automobile roof wherein the carrier brackets and frames may be lowered, when not in use, into recesses provided in the roof of the automobile so as to eliminate any unsightly or undesirable protrusions which detract from the appearance of the modern automobile.

An object of the present invention is to provide a carrier means for the top of an automobile with end supports pivotally mounted within the roof of the automobile which permit them to be lowered into suitable recesses in the roof of the automobile. Through the provision of the recesses the supports and carrier means are inconspicuous when not in use.

Still another object of the present invention is to provide a carrier for the roof of an automobile which is built into the roof of the automobile as an integral part thereof and one which may be readily raised to an operative position or collapsed or lowered into the roof of the automobile when not in use.

Another object of the present invention is to provide a carrier means integrally mounted in the top of a motor vehicle characterized by its structural simplicity, the ease of assembly of its parts, its strong and sturdy nature and its low manufacturing cost. Other features of this invention reside in the arrangement and design of the parts for carrying out their appropriate functions.

Further objects of the present invention and certain practical advantages will be referred to in or will be evident from the following description of two embodiments of the invention, as illustrated in the accompanying drawings, in which:

FIGURE 1 is a perspective view of a modern automobile of the station-wagon type having a carrier mounted in the roof thereof and showing said carrier in a retracted position.

FIGURE 2 is an enlarged top plan view of the carrier.

FIGURE 3 is a transverse sectional view taken along the plane of line 3—3 of FIGURE 2 and showing the details of construction of the carrier and its mounting in the roof of an automobile.

FIGURE 4 is an enlarged fragmentary sectional view of the locking means for maintaining the carrier in a raised position such as shown in FIGURE 3.

FIGURE 5 is a perspective view of a modern automobile of the station-wagon type showing a modified form of the present invention wherein a plurality of corner brackets are provided for mounting a removable carrier to the roof of the automobile.

FIGURE 6 is a transverse sectional view taken along the plane of line 6—6 of FIGURE 5 and showing the details of construction for mounting the corner brackets in the roof of the automobile, and FIGURE 7 is a vertical sectional view taken along the plane of line 7—7 of FIGURE 6 and showing the hinge connection of the brackets within the roof of the automobile.

Before describing in detail the herein disclosed embodiments of the invention, it is to be understood that the present invention is not limited to the structural details or the particular arrangement of parts herein shown, as devices embodying the present invention may take other forms. It also is to be understood that the phraseology and terminology herein used are for the purpose of description and not of limitation, as the scope of the present invention is denoted by the appended claims.

As shown in FIGURE 1 a modern automobile generally indicated at 9 is provided with a pair of identical longitudinally spaced transversely extending carrier support members each of which comprises an end member 10 and 10'. The end members are pivotally connected to the roof of the automobile and a central transversely extending carrier frame member 11 is telescopically mounted between the end members 10 and 10'.

Referring to FIGURES 2 and 3 each end member 10 and 10' comprise a base bracket 12 which is pivotally mounted by means of a pivot pin 13 in the roof of the automobile. The base bracket is generally of U-shape and the pin 13 extends through the lower end thereof with its distal ends mounted between the side walls 14a of a recess provided in the roof 14 of the automobile as shown in FIGURE 2. A suitable recess or hand hole 15 is provided in the bracket 12 which is adapted for engagement by the fingers of an operator for the purpose of raising and lowering the bracket 12. The upper or innermost end of each bracket 12 is provided with a suitable projecting hinge portion 16 which is pivotally connected by a pin 17 to a carrier frame and support member 18. A central transversely extending carrier frame member 11 is telescopically supported by its end support members 18 as seen in FIGURES 2 and 3. The members 11 and 18 are preferably rectangular tubular members, however sections of other shape may be used.

A snap lock is provided for maintaining the members in a raised or operative position, as shown in FIGURE 3. The lock consists of a locking pin 20 which is slidably supported on a guide pin 22 which is rigidly mounted within the hollow confines of the central transversely extending carrier frame member 11. An enlarged shoulder or flange 24 is provided on the pin 20. A coil spring 26 is compressed between the under surface of said shoulder 24 and the inner surface of the frame member 11, as seen in FIGURE 4. A suitable aperture 28 is provided in the top surface of the frame member 11 and is adapted to align itself with aperture 30 provided in the arm member 18. When the carrier is in a raised position as shown in FIGURE 3 the apertures 28 and 30 are in registry with each other; this permits the pin member 20 to engage and lock members 11 and 18 together due to the upward urging provided by the compressed coil spring 26 which forces the pin into engagement with aligned apertures 28 and 30. When it is desired to lower the carrier from the position shown in FIGURE 3, to that shown in FIGURE 1, the pin member 20 is merely depressed so that it becomes disengaged from the aperture 30 provided in the carrier frame and support member 18 thus permitting the carrier frame member 11 to telescopically slide into the hollow members 18. With this action the end brackets 12 are lowered about hinge pins 13 into the recess provided in the roof, so as to be inconspicuous when not in use. It will be understood that additional removable suitable longitudinally extending frame members (not shown) may be secured between the spaced transversely extending frame members to provide a carrier of greater support area. However, the materials to be carried may also be supported directly upon the transversely extending frame members 11.

In FIGURES 5-7, I have shown another embodiment of the present invention wherein a plurality of transversely spaced brackets 30 which are adapted to support suitable removable carrier frames are recessed within the roof of a conventional automobile 31. The brackets have a curved outer contour, as seen in FIGURE 6, to conform to the outer contour of the roof when in a closed position. Here the brackets 30 are hingedly mounted to the roof 40 by means of a common hinge spring. The hinge springs have a lower arm 36 secured within a recess 38 provided in the roof 40 and are provided at their centers with a central pivot portion and an upper arm 42 which is secured to the inner surface of the bracket 30. Each bracket 30 is provided with a U-shaped support frame member 44 which has an upper surface providing a shoulder upon which a removable transversely extending carrier frame 46 as shown in FIG. 6, may rest. Suitable aligned apertures are provided in the members 44 and 46 which receive a retaining bolt 48 and not 50 and secure the members 44 and 46 together, as seen in FIGS. 6 and 7. In operation the transversely opposed brackets 30 are raised from their lowered position, shown in FIGURE 5, to the raised position shown in FIGURE 6, and a transversely extending carrier frame member 46 inserted between the brackets, as seen in FIGURE 6. The remaining pair of transversely spaced brackets 30 are then opened and a transversely extending carrier frame member positioned between them. If desired additional longitudinally extending members (not shown) may be secured between the spaced transversely extending carrier members 46 for the purpose of providing additional supporting surface. The hinged spring members are preferably of the type which normally urge the brackets into the closed position as shown in FIGURE 5, however, they also have the feature of urging the brackets toward a fully open position when the brackets are opened beyond a certain point. This type of spring is often found in connection with the covers provided on modern automobiles for covering the intake caps of gasoline tanks.

I have thus provided means whereby the modern automobile may be provided with a roof carrier which is capable of being collapsed when not in use and is therefore not unsightly when not in use. Furthermore, I have provided means which eliminate the type of clamps which are presently used and which can cause extensive damage to the finished surface of an automobile since they normally hook directly upon the roof surface and engage the gutter or side edge of the roof and easily chip or scratch the painted surfaces. In addition to eliminating destructive clamps on carriers, the present invention discloses means which are continuously but inconspicuously present in an automobile with which they are incorporated. Since the device is recessed permanently within the roof of an automobile it is always available for immediate use and does not take up additional space in the trunk of the automobile when not in use.

In view of the foregoing description, taken in conjunction with the accompanying drawings, it is believed that a clear understanding of the construction, operation and advantages of the device will be quite apparent to those skilled in this art.

Having thus described my invention, what I claim is new and useful and desire to secure by United States Letters Patent, is:

In combination with an automobile roof, a pair of parallel transversely extending longitudinally spaced recesses provided in said roof, elongated telescopic carrier support means provided in each of said recesses, each of said carrier support means comprising pairs of transversely spaced frame support brackets, said brackets being pivotly mounted within said recesses provided in said roof to permit said brackets to be lowered into a position wherein their outer surfaces conform to the outer contours of said roof, an extensible telescopic carrier frame member pivotly mounted at its free ends between each pair of said transversely spaced brackets, said extensible telescopic carrier frame members being received within said transversely extending recesses in a manner wherein the side surfaces of said frame members conform closely to the side walls of said recesses and the outer surface of said frame member conform to the outer contour of said roof and substantially fill the recess to provide a smooth, continuous roof surface once said members are in a lower position, each of said frame members adapted to be raised out of its associated recess when its brackets are raised, and lowered into its associated recess when its associated brackets are lowered, and locking means operatively associated with each of said frame members to releasably lock each frame and its associated bracket members in a raised position.

References Cited in the file of this patent

UNITED STATES PATENTS

| 859,233 | Lane | July 9, 1907 |
|---|---|---|

FOREIGN PATENTS

| 450,002 | Great Britain | July 8, 1936 |
|---|---|---|
| 471,194 | Italy | May 7, 1952 |
| 1,056,981 | France | Oct. 28, 1953 |